United States Patent
Chari et al.

(10) Patent No.: US 10,372,631 B2
(45) Date of Patent: Aug. 6, 2019

(54) SANITIZING MEMORY OF CLOUD SYSTEMS

(71) Applicant: International Business Machines Corporation, Armonk, NY (US)

(72) Inventors: Suresh N. Chari, Tarrytown, NY (US); Ashish Kundu, Elmsford, NY (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/428,238

(22) Filed: Feb. 9, 2017

(65) Prior Publication Data
US 2018/0225227 A1 Aug. 9, 2018

(51) Int. Cl.
*G06F 12/14* (2006.01)
*G06F 21/62* (2013.01)
*G06F 9/455* (2018.01)
*G06F 12/0864* (2016.01)

(52) U.S. Cl.
CPC ...... *G06F 12/1458* (2013.01); *G06F 9/45558* (2013.01); *G06F 12/0864* (2013.01); *G06F 21/6245* (2013.01); *G06F 2009/45583* (2013.01); *G06F 2009/45587* (2013.01); *G06F 2212/1052* (2013.01); *G06F 2212/152* (2013.01); *G06F 2212/154* (2013.01); *G06F 2212/60* (2013.01); *G06F 2221/2143* (2013.01)

(58) Field of Classification Search
CPC ............ G06F 12/1458; G06F 9/45558; G06F 9/45583; G06F 12/0864; G06F 21/6245; G06F 2009/45583; G06F 2212/1052; G06F 2212/152; G06F 2212/154; G06F 2212/60
See application file for complete search history.

(56) References Cited

U.S. PATENT DOCUMENTS

| | | |
|---|---|---|
| 4,417,338 A | 12/1983 | Davida |
| 5,940,507 A | 8/1999 | Cane et al. |
| 6,243,811 B1 | 6/2001 | Patel |
| 2006/0021005 A1* | 1/2006 | Williams ............... G06F 21/313 726/2 |

(Continued)

FOREIGN PATENT DOCUMENTS

WO 2015015473 A1 2/2015

OTHER PUBLICATIONS

Tolomei, G., 2014. "Virtual Memory, Paging, and Swapping," https://gabrieletolomei.wordpress.com/miscellanea/operating-systems/virtual-memory-paging-and-swapping/.*

(Continued)

*Primary Examiner* — Tracy A Warren
(74) *Attorney, Agent, or Firm* — Law Office of Jim Boice (57) ABSTRACT

A computer-implemented method sanitizes memory in a cloud environment. One or more processors in a computer receive a hypercall resulting from a call from an application running in a computer. The hypercall is to a hypervisor that manages a virtual memory. The hypercall directs the hypervisor to sanitize data in the virtual memory, where sanitizing the data applies a data remanence policy that prevents remanence data in the virtual memory from being accessed by an unauthorized user. In response to receiving the hypercall, one or more processors sanitize the data in the virtual memory that is allocated for use by the application.

20 Claims, 9 Drawing Sheets

(56) References Cited

U.S. PATENT DOCUMENTS

| | | | |
|---|---|---|---|
| 2013/0144845 A1* | 6/2013 | Ghuge | G06F 17/3015 |
| | | | 707/692 |
| 2013/0254507 A1* | 9/2013 | Islam | G06F 21/6218 |
| | | | 711/166 |
| 2014/0006350 A1* | 1/2014 | Fukui | G06F 17/30377 |
| | | | 707/632 |
| 2014/0136577 A1* | 5/2014 | Cherel | G06F 21/6227 |
| | | | 707/813 |
| 2014/0331279 A1 | 11/2014 | Aissi et al. | |
| 2015/0033221 A1 | 1/2015 | Chari et al. | |
| 2015/0317491 A1 | 11/2015 | Yang et al. | |
| 2016/0335004 A1* | 11/2016 | Jones | G06F 3/0619 |

OTHER PUBLICATIONS

P. Mell et al., "The NIST Definition of Cloud Computing", National Institute of Standards and Technology, Information Technology Laboratory, Sep. 2011, pp. 1-7.

* cited by examiner

SANITIZING MEMORY OF CLOUD SYSTEMS

BACKGROUND

The present invention relates to the field of computers, and particularly to computers that support cloud-based environments. Still more particularly, the present invention relates to sanitizing memory in a cloud environment.

SUMMARY

In one or more embodiments of the present invention, a computer-implemented method sanitizes memory in a cloud environment. One or more processors in a computer receive a hypercall resulting from a call from an application running in a computer. The hypercall is to a hypervisor that manages a virtual memory. The hypercall directs the hypervisor to sanitize data in the virtual memory, where sanitizing the data applies a data remanence policy that prevents remanence data in the virtual memory from being accessed by an unauthorized user. In response to receiving the hypercall, one or more processors sanitize the data in the virtual memory that is allocated for use by the application.

The described invention may also be implemented in a computer system and/or as a computer program product.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
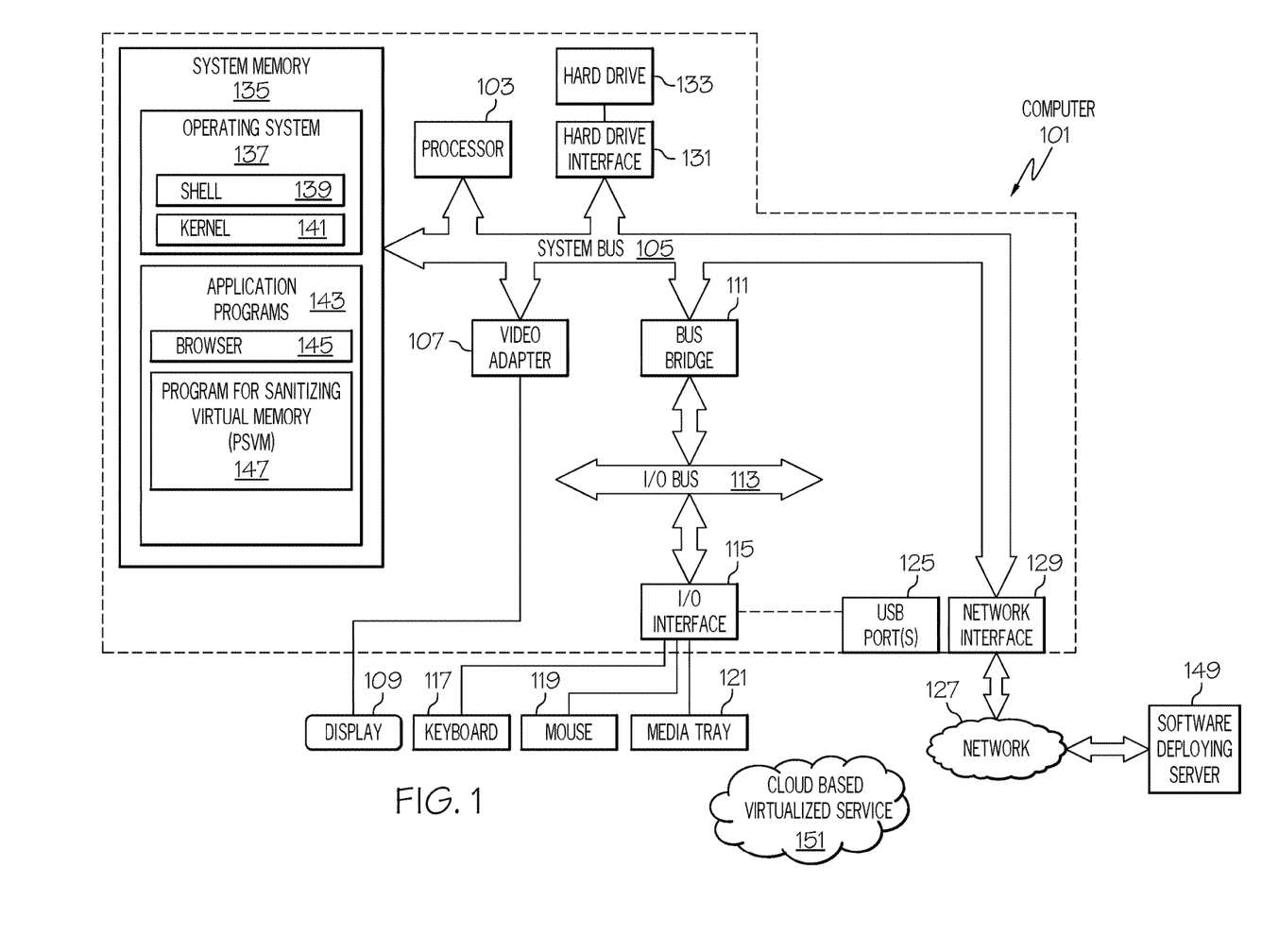
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or computer 201 and/or servers 206a-206n and/or VM image manager 208 shown in FIG. 2 and/or hypervisor 501 shown in FIG. 5.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as systems that support the depicted cloud-based virtualized service 151, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Sanitizing Virtual Memory (PSVM) 147. PSVM 147 includes code for implementing the processes described below, including those described in FIGS. 2-7. In one embodiment, computer 101 is able to download PSVM 147 from software deploying server 149, including in an on-demand basis, wherein the code in PSVM 147 is not downloaded until needed for execution. In one embodiment of the present invention, software deploying server 149 performs all of the functions associated with the present invention (including execution of PSVM 147), thus freeing computer 101 from having to use its own internal computing resources to execute PSVM 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Virtualized composite services are services that employ multiple virtual machine (VM) instances specific to a workflow topology. The service instance (composition of VM instances) is constructed out of multiple images, image templates, and/or pre-configuration data. The configuration, topology and meta-data required for creation of a service consists of instances created out of these images and integrated to provide the required functionality.

Figure 2:
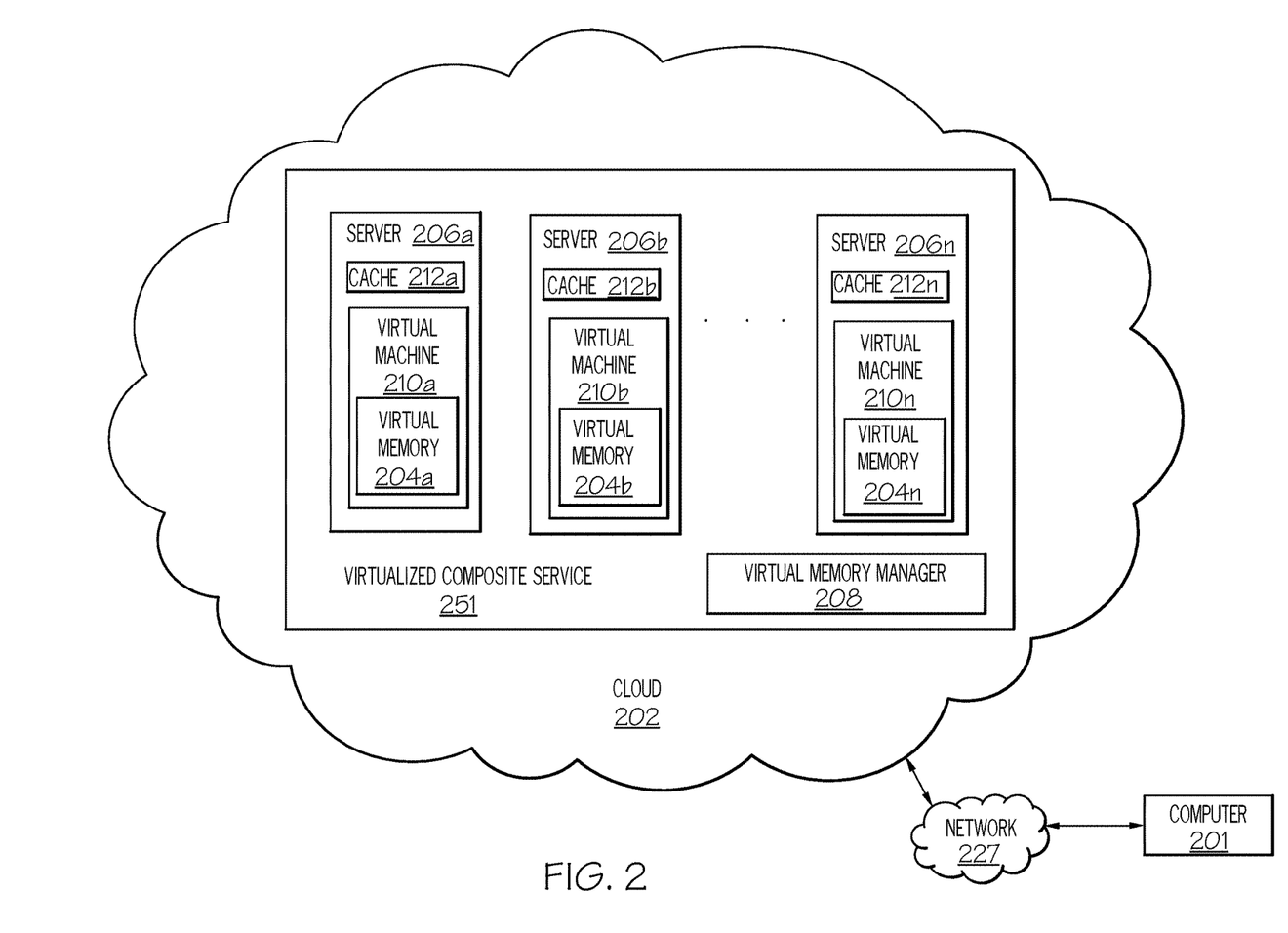
FIG. 2 illustrates an exemplary virtualized composite service as utilized in one or more embodiments of the present invention.

With reference now to FIG. 2, consider an exemplary virtualized composite service 251 (analogous to the cloud-based virtualized service 151 shown in FIG. 1) as utilized in one or more embodiments of the present invention.

A computer 201 (analogous to computer 101 shown in FIG. 1) uses a network 227 (analogous to network 127 shown in FIG. 1) to communicate with a cloud 202 of resources. Cloud 202 provides shared computer processing resources and data to computer 201 on demand, and includes a shared pool of configurable computing resources (e.g., computer networks, servers, storage, applications and services), including the depicted virtualized composite service 251.

In an exemplary embodiment of the present invention, virtualized composite service 251 includes multiple virtual memories 204a-204n (where "n" is an integer) running on one or more virtual machines 210a-210b, which are running on physical servers, including the depicted servers 206a-206n. In an embodiment of the present invention, the virtual memories 204a-204b are not part of the virtual machines 210a-210b, but rather run directly on the servers 206a-206n under the direction/supervision of a virtual memory manager 208. While each of the virtual memories 204a-204n is depicted running on a separate server from servers 206a-206n, it is understood that more than one of the virtual memories 204a-204n may be hosted (run on) just one of the servers 206a-206n.

Thus, in one or more embodiments of the present invention in which virtual memories 204a-204n are running either within the virtual machines 210a-210n or without use of the virtual machines 210a-210n, the virtual memories 204a-204n are under the control of a virtual memory manager 208, which coordinates the sanitization of the virtual memories 204a-204n as described herein.

Also on servers 206a-206n are caches 212a-212n, which cache data for applications that are using the virtual memories 204a-204n. In an embodiment of the present invention, caches 212a-212n are physical caches on the servers 206a-206n, as depicted. In another embodiment, one or more of the caches 212a-212n are virtual caches, that are created using multiple physical caches in the virtualized composite service 251.

Each of the virtual memories 204a-204n (and/or caches 212a-212n) may contain sensitive data, which needs to be sanitized (e.g., removed, encrypted, etc.). That is, when a program runs (e.g., on one or more of the virtual machines 210a-210n), the program stores keys, passwords, sensitive data, tokens etc. in the memory (e.g., virtual memories 204a-204n) and/or cache, including the caches 212a-212n shown in FIG. 2.

The memory contents of the virtual memories 204a-204n (and/or caches 212a-212n) remain as it is, unless they are cleaned/sanitized properly. That is, the remaining memory contents (also known as remanence data, since it is data that persists just as a magnetization of a device may persist) needs to be deleted, encrypted, or otherwise protected (known as "sanitizing" the data). If the remanence data from memory is not sanitized, then there is a risk of disclosure of sensitive data when another program is allocated use of that memory (the virtual memories 204a-204n and/or caches 212a-212n), when that memory is inspected by unauthorized users/processes, during cold-boot attacks (e.g., attacks that occur when an application is being booted up), when the memory is exposed via cloning of virtual machines, when virtual memory swapping occurs between two applications, when memory used by one virtual machine is allocated to another virtual machine after the first virtual machine has been destroyed/stopped.

Challenges in sanitizing virtual memories are numerous.

For example, consider the language Java®. (Java is a registered trademark of Oracle and/or its affiliates. Other names may be trademarks of their respective owners.). Java manages memory such that many copies of objects on a heap are stored. Thus, sanitization of memory from a Java heap is difficult. Java does not have overwrite statements for heaps, and thus any overwrite may not overwrite memory of Java heaps.

Paging also presents challenges. For example, swapped out pages stored on a disk may contain sensitive data. If a system crash occurs, then the disk (and thus the pages with the sensitive data) may be exposed when the system comes back on line.

Virtual memory (e.g., the virtual memories 204a-204n shown in FIG. 2) pose particular challenges. That is, sanitizing virtual memory (as part of a virtual machine or standing alone) is hard because memory management is not carried out by guest operating systems entirely. That is, hypervisors may be storing copies of virtual memory.

Furthermore, memory contents may be available in the random access memory/dynamic ransom access memory (RAM/DRAM), such as system memory 135 shown in FIG. 1 when incorporated into one or more of the servers 206a-206n shown in FIG. 2, when a virtual machine (e.g., one or more of the virtual machines 210a-210n) is stopped. Thus, the content of the RAM/DRAM in the servers 206a-206n may still be available for other virtual machines and/or hypervisors (even those outside of the virtualized composite service 251).

Thus, as described herein, one or more embodiments of the present invention sanitize some or all of the virtual memories and/or hardware cache and/or hardware RAM/DRAM so that attacks (including but not limited to cold-boot attacks) are prevented.

As described herein, the present invention may sanitize specific locations of the memory associated with the virtual machines, sanitize only the sensitive content in the memory associated with the virtual machines, sanitize the memory used by a specific application program, and/or sanitize cache blocks.

In order to sanitize memory (including virtual memory) associated with a virtual machine or other virtual resource, one or more embodiments of the present invention utilize a labeler and a sanitizer to sanitize memory associated with a virtual machine (i.e., remove, encrypt, or otherwise prevent sensitive data from being released from a virtual resource). That is, the labeler 300 and sanitizer 400 described below in FIG. 3 and FIG. 4 respectively reside in each of the virtual machines 210a-210n shown in FIG. 2. As described in detail below, any inconsistencies in these labelers/sanitizers 300/400 are resolved to create a sanitized virtualized composite service from the virtualized composite service 251 shown in FIG. 2.

Figure 3:
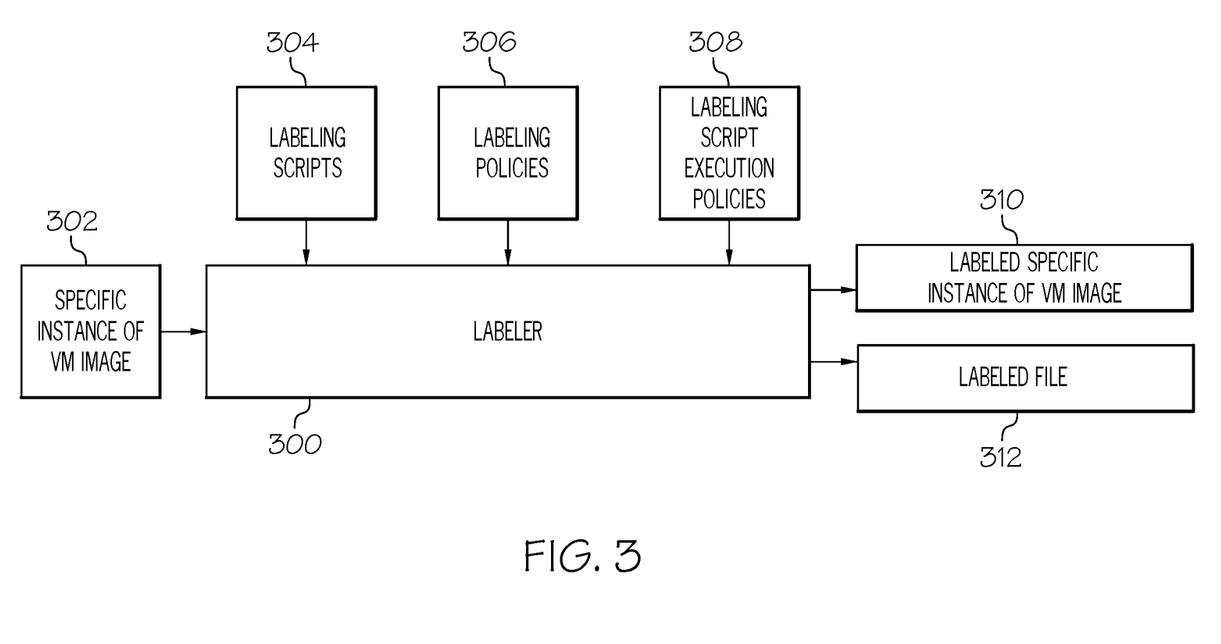
FIG. 3 depicts an exemplary labeler used to label sensitive data contained within a virtual memory within the virtualized composite service depicted in FIG. 2.

With reference now to FIG. 3, a diagram illustrating a labeler is depicted in accordance with an illustrative embodiment of the present invention. Labeler 300 labels sensitive data contained within one or more software components of a software stack installed on a virtual machine image (e.g., one or more of the virtual machines 210a-210n shown in FIG. 2), such as the specific instance of VM image 302 shown in FIG. 3.

Labeler 300 includes labeling scripts 304, labeling policies 306, and labeling script execution policies 308. Labeling scripts 304 may include a list of paths to and/or locations of sensitive data contained within each software component of the software stack in specific instance of virtual machine image 302. Labeling scripts 304 define types of sensitive data using, for example, an extensible markup language. As a result, labeling scripts 304 are able to discover installation paths, files, and presence or absence of particular sensitive data items within, for example, data caches or system logs. Further, labeling scripts 304 generate an appropriate sensitivity level label for each identified sensitive data item and each path to the locations of the identified sensitive data items when applied to specific software components of the software stack in specific instance of virtual machine image 302.

Labeling policies 306 define the particular sensitivity levels associated with each type of sensitive data item. For example, labeling policies 306 may define a password data item as having a high sensitivity level, whereas a system log data item may have a medium sensitivity level. Labeling policies 306 may define the particular sensitivity levels associated with each type of sensitive data item using, for example, extensible markup language or comma-separated values.

For each particular software component of the software stack installed on specific instance of virtual machine image 302, at least one labeling script exists for that particular software component. Labeling scripts 304 are executable code that are executed for a particular virtual machine image or instance based on specified labeling script execution policies, such as labeling script execution policies 308. Labeling script execution policies 308 specify an order of execution for labeling scripts 304 based on identified labeling dependencies between the software components of the software stack installed on specific instance of virtual machine image 302. The identified labeling dependencies may be represented by a directed acyclic graph, for example.

Some labeling scripts in labeling scripts 304 are executed, for example, in a specified order, which is a total dependent order of execution. For example, labeling script execution policies 308 may specify that if labeling script LS(1) fails or throws an exception, then labeling script execution policies 308 specify that the execution of labeling script LS(2) is to be aborted. In other words, the labeling script execution policy of <LS(1),LS(2)> is a total dependent order of execution policy. In contrast, some labeling scripts may be executed in any order, which is a partial dependent order of execution.

Each labeling script in labeling scripts 304 determines a location of each particular data item type, determines whether each particular data item type and corresponding values need to be labeled, and, if labeled, which sensitivity level label is to be applied to that particular data item type. Labeling scripts 304 embed the sensitivity level labels in specific instance of virtual machine image 302 by attaching the labels to the sensitive data items and updating specific instance of virtual machine image 302 to form labeled specific instance of virtual memory image 310. Alternatively, labeling scripts 304 may utilize, for example, a label file, such as label file 312, to store the associations between each particular identified sensitive data item and its respective sensitivity level label. A virtual machine image manager, such as virtual machine image manager 208 in FIG. 2, may provide labeled specific instance of virtual memory image 310 and/or label file 312 to a sanitizer at a later point in time so that the sanitizer can identify the labeled sensitive data items and sanitize them. The sanitizer may be, for example, sanitizer 400 shown below in FIG. 4.

Labeler 300 executes labeling scripts 304 for the operating system in the order specified by labeling script execution policies 308. Based on the order of execution, labeler 300 executes labeling script LS(j) if the conditions in labeling script execution policies 308 evaluate to true for labeling script LS(j). For example, in one embodiment an ordering condition AND a failure condition are true for labeling script LS(j). The ordering condition is true for labeling script LS(j) if all the labeling scripts LS(i), which are before labeling script LS(j) in the total dependent order of execution, have already been executed. Total dependent order of execution exists between labeling script LS(i) and labeling script LS(j) if a path from labeling script LS(i) to labeling script LS(j) exists in the directed acyclic graph of labeling dependencies. In contrast, labeling script LS(i) and labeling script LS(k) are in partial dependent order of execution if no direct path exists between LS(i) and LS (k) in the directed acyclic graph of labeling dependencies.

The failure condition is true for labeling script LS(j) if all the labeling scripts LS(i), which precede labeling script LS(j) in total dependent order of execution, have been successfully executed. In other words, no failure or exception is raised during execution of labeling scripts LS(i). The failure condition also is true for labeling script LS(j) if labeling scripts LS(i+m) to LS(i+n), which precede labeling script LS(j) in total dependent order of execution, failed to execute or led to an exception AND labeling script execution policies 308 specify directly or indirectly that execution of labeling script LS(j) can proceed in the event of such failures or exceptions. It should be noted that "m" is greater than or equal to "n" above.

Figure 4:
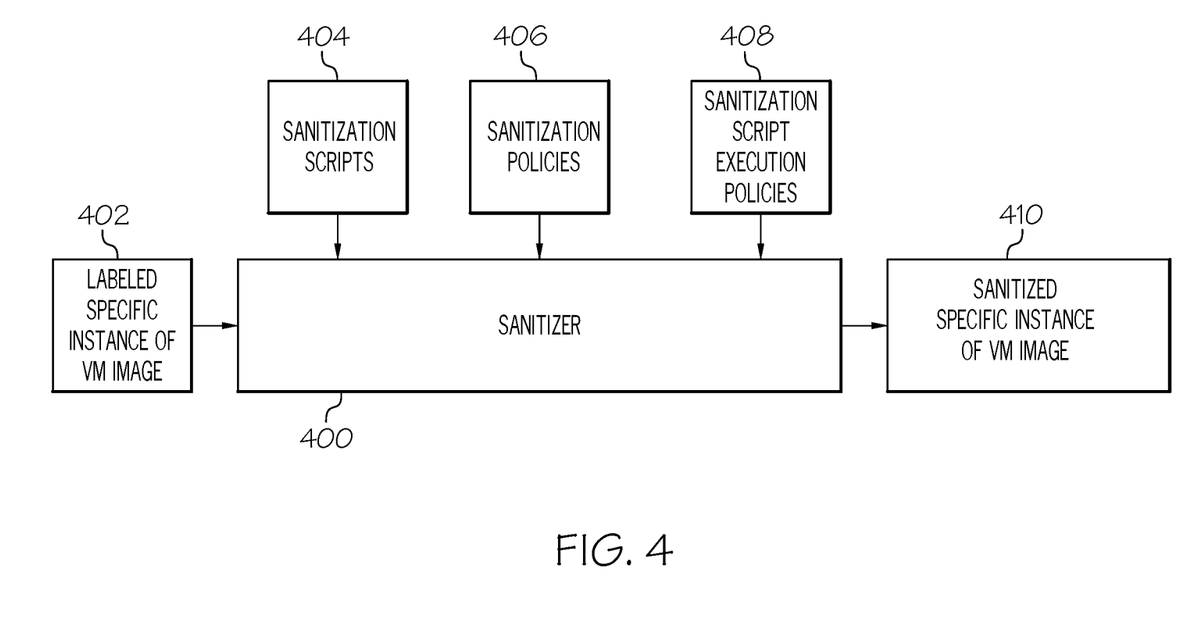
FIG. 4 illustrates an exemplary sanitizer for sanitizing labeled sensitive data contained within a virtual memory within the virtualized composite service depicted in FIG. 2.

With reference now to FIG. 4, a diagram illustrating a sanitizer 400 is depicted in accordance with an illustrative embodiment. Sanitizer 400 sanitizes sensitive data contained within one or more software components of a software stack installed in a labeled virtual machine image, such as labeled specific instance of virtual machine image 402.

Sanitizer 400 includes sanitization scripts 404, sanitization policies 406, and sanitization script execution policies 408. Sanitization scripts 404 may be developed in programming languages such as Perl script, Python script, shell script, or any other programming language. Sanitization scripts 404 apply sanitization policies 406 in order to sanitize labeled sensitive data located within one or more software components of a software stack in labeled specific instance of virtual machine image 402. As a result, sanitization scripts 404 output sanitized specific instance of virtual machine image 410. In addition, sanitization scripts 404 may also update a sanitization history of sanitized specific instance of virtual machine image 410 either locally or remotely and update labeling information located in a label file, such as label file 312 in FIG. 3, associated with the specific instance of the virtual machine image. Further, sanitization scripts 404 may set the next sanitization process, event, and/or time if it is a regularly scheduled process.

Sanitization policies 406 specify sanitization action types and sanitization action details. Sanitization action types may include, for example, a delete action, an overwrite action, an encrypt action, and a backup deleted or overwritten data action. Sanitization action details may specify, for example, overwrite a particular sensitive data item type with a particular value and encrypt another particular sensitive data item type with a particular cryptographic key.

A sanitization policy in sanitization policies 406 may take the form of <sensitive data item type, associated sensitivity level label, and corresponding sanitization action type>, for example. Sanitization policies 406 also may specify time of sanitization, offline or online sanitization, events that trigger the sanitization process, and authorized credentials to initiate a sanitization process. A sanitization policy may be developed as an extension of the open virtualization format for a specific instance of virtual machine image or for a composite virtual machine image.

For each particular software component of the software stack installed on labeled specific instance of virtual machine image 402, at least one sanitization script exists for that particular software component. Sanitization scripts 404 are executable code that is executed for a particular virtual machine image or instance based on specified sanitization script execution policies, such as sanitization script execution policies 408. Sanitization script execution policies 408 specify an order of execution for sanitization scripts 404 based on identified sanitization dependencies between the software components of the software stack installed on labeled specific instance of virtual machine image 402. The identified sanitization dependencies may be represented by a directed acyclic graph, for example.

Some sanitization scripts in sanitization scripts 404 are executed in a specified order, which is a total dependent order of execution. For example, sanitization script execution policies 408 may specify that if sanitization script SS(1) fails or throws an exception, then sanitization script execution policies 408 specify that the execution of sanitization script SS(2) is to be aborted. In other words, the sanitization script execution policy of <SS(1),SS(2)> is a total dependent order of execution policy. In contrast, some sanitization scripts may be executed in any order, which is a partial dependent order of execution.

Each sanitization script in sanitization scripts 404 identifies labeled sensitive data items contained within software components of the software stack installed on labeled specific instance of virtual machine image 402. In addition, each sanitization script determines which sanitization action to perform on a labeled sensitive data item based on a corresponding sanitization policy that maps a particular sensitivity level label to a particular sanitization action for sanitizing the sensitive data item.

Sanitizer 400 executes sanitization scripts 404 for the operating system in the order specified by sanitization script execution policies 408. Based on the order of execution, sanitizer 400 executes sanitization script SS(j) if the conditions in sanitization script execution policies 408 evaluate to true for sanitization script SS(j). For example, in one embodiment an ordering condition AND a failure condition are true for sanitization script SS(j). The ordering condition is true for sanitization script SS(j) if all the sanitization scripts SS(i), which are before sanitization script SS(j) in the total dependent order of execution, have already been executed. Total dependent order of execution exists between sanitization script SS(i) and sanitization script SS(j) if a path from SS(i) to SS(j) exists in the directed acyclic graph of sanitization dependencies. In contrast, sanitization script SS(i) and sanitization script SS(k) are in partial dependent order of execution if no direct path exists between SS(i) and SS(k) in the directed acyclic graph of sanitization dependencies.

The failure condition is true for sanitization script SS(j) if all the sanitization scripts SS(i), which precede sanitization script SS(j) in total dependent order of execution, have been successfully executed. In other words, no failure or exception is raised during execution of sanitization scripts SS(i). The failure condition also is true for sanitization script SS(j) if sanitization scripts SS(i+m) to SS(i+n), which precede sanitization script SS(j) in total dependent order of execution, failed to execute or led to an exception AND sanitization script execution policies 408 specify directly or indirectly that execution of sanitization script SS(j) can proceed in the event of such failures or exceptions. It should be noted that "m" is greater than or equal to "n" above.

Figure 5:
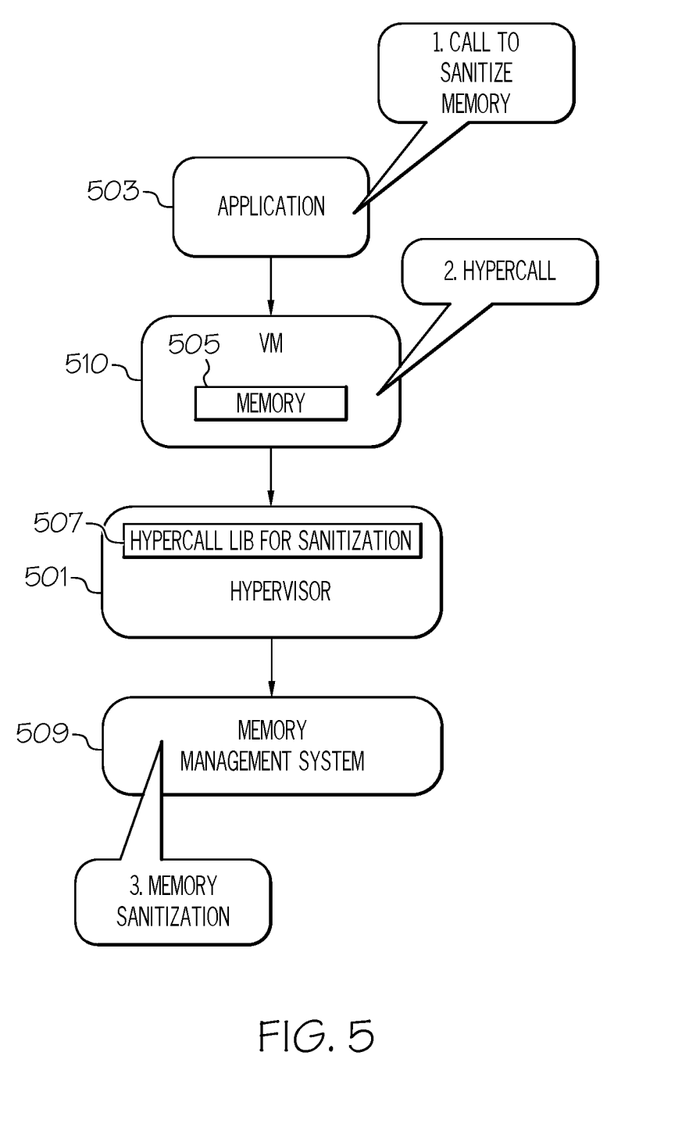
FIG. 5 depicts a virtual memory being sanitized in accordance with one or more embodiments of the present invention.

With reference now to FIG. 5, assume that an application 503 is running on computer 201 shown in FIG. 2. Assume further that application 503 has been using virtual memory 204a to supply and/or store data resulting from the execution of application 503. Assume even further that application 503 wants to now sanitize this data (i.e., delete it, move it to another secure location, encrypt it, or otherwise protect the data from being accessed by an unauthorized entity). This motivation to sanitize the data may be the result of the application closing, a virtual machine that houses the virtual memory 204a being reconfigured on another device, etc.

As shown in FIG. 5, the application 503 will first send a call to a virtual machine 510 (analogous to one of the virtual machines 210a-210n shown in FIG. 2). This call to virtual machine 510 requests that a memory 505 (e.g., one of the virtual memories 204a-204n, caches 212a-212n, etc.) associated with or within virtual machine 510 be sanitized. However, virtual machine 510 and/or memory 505 are not to sanitize the memory 505 on their own, since there would be no oversight of the process if they were to do so. Therefore, the virtual machine 510 will send a hypercall (i.e., a call to a hypervisor 501) requesting that the hypervisor 501 sanitize memory 505.

Hypervisor 501 is a virtual machine monitor that manages virtual machines (e.g., virtual machines 510) and their associated virtual and/or real memory (e.g., memory 505). Hypervisor 501 may be implemented as software, firmware, and/or a dedicated hardware that utilizes some or all of the components shown in FIG. 1 for computer 101. Hypervisor 501 is also responsible in one or more embodiments for creating and running virtual machines, virtual memories, etc.

As shown in FIG. 5, the hypercall from the virtual machine 510 to the hypervisor 501 is matched to a hypercall library 507, which is a library of routines used to sanitize memories such as memory 505. That is, the hypercall from the virtual machine 510 describes the type of memory to be sanitized, what type of data needs to be sanitized, whether the sanitization is to be permanent or temporary, etc.

The hypervisor 501 then sends the appropriate memory sanitization instruction to a memory management system 509, which is hardware and/or software that directly manages the memory 505. That is, memory management system 509 is a memory controller that in various embodiments of the present invention is a dedicated computer chip, firmware, and/or software that controls how data in memory 505 is stored, read, erased, encrypted, etc. Thus, in the present invention, the memory management system 509 will directly sanitize the memory 505 according to instructions retrieved from the hypercall library 507 according to the hypercall from the virtual machine 510.

As described above, one or more embodiments of the present invention described in FIG. 5 utilize a memory management system 509 to sanitize a memory 505, such as a virtual memory, within a virtual machine 510. However, in another embodiment, the present invention sanitizes a physical device that is used by a virtual machine. That is, consider FIG. 6, which depicts sanitizing a hardware memory being used by a virtual machine in accordance with one or more embodiments of the present invention.

As in FIG. 5, an application 503 sends a call to sanitize memory to a virtual machine 510 (Step 1), which sends a hypercall to the hypervisor 501 (Step 2), which sends a memory sanitization request to the memory management system 509 (Step 3). However, rather than directly sanitizing the memory 505 (as in FIG. 5), in FIG. 6 the memory management system 509 sends a message (Step 4) to a hardware sanitization module in hardware 604 that supplies data to the memory 505. That is, assume that memory 505 is a virtual memory (e.g., one or more of the virtual memories 204a-204n shown in FIG. 2). Assume now that hardware 604 is a hardware storage device (e.g., a memory chip, a hardware cache such as one or more of the caches 212a-212n shown in FIG. 2) that supplies the data that is found in the virtual memory (i.e., memory 505). As such, in FIG. 6 the memory management system 509 directly controls the hardware memory device (e.g., a memory chip) to sanitize the data that it has been supplying to the memory 505.

Figure 7:
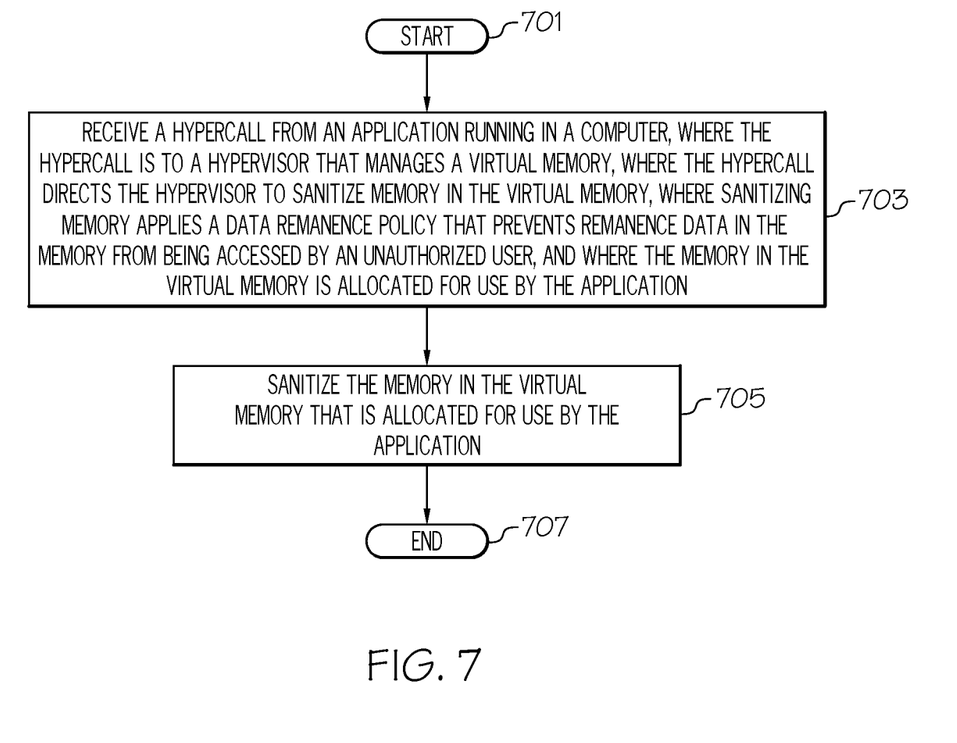
FIG. 7 is a high-level flow chart illustrating a process in accordance with one or more embodiments of the present invention.

With reference now to FIG. 7, a high-level flow chart illustrating a process for sanitizing memory in a cloud environment in accordance with one or more embodiments of the present invention is presented.

After initiator block 701, one or more processors (e.g., within a server supporting virtual memory manager 208 shown in FIG. 2) and/or other hardware devices (e.g., memory management system 509 shown in FIG. 5) receive a hypercall resulting from a call from an application running in a computer (e.g., computer 201 shown in FIG. 2), as described in block 703. For example and as shown in FIG. 5, this hypercall is the result from a call from application 503 requesting that memory 505 be sanitized. As described in FIG. 5, the hypercall is to a hypervisor (e.g., hypervisor 501 shown in FIG. 1) that manages a virtual memory (e.g., memory 505 when architected as a virtual memory). The hypercall directs the hypervisor to sanitize data in the virtual memory, where sanitizing data applies a data remanence policy that prevents the residual/remanence data in the virtual memory from being accessed by an unauthorized user. For example, a data remanence policy may require that any residual data (i.e., remanence data) still in the virtual memory be expunged, deleted, encrypted, moved to a secure location, etc. (i.e., sanitized).

As described in block 705 of FIG. 7, in response to receiving the hypercall, one or more processors then sanitize the data in the virtual memory that is allocated for use by the application.

The flow chart ends at terminator block 707.

Figure 6:
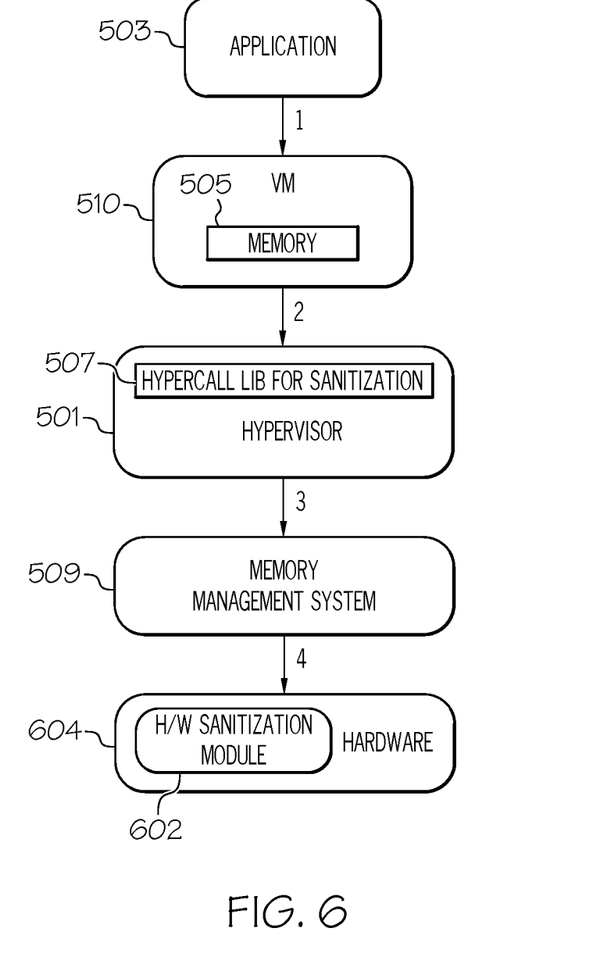
FIG. 6 depicts sanitizing a hardware memory being used by a virtual machine in accordance with one or more embodiments of the present invention.

As described in FIG. 6, in an embodiment of the present invention a hardware sanitization module (e.g., hardware sanitization module 602) sanitizes a hardware memory (e.g., a memory chip such as hardware 604) that provides data to the virtual memory.

In an embodiment of the present invention, one or more processors rank pages of data in the virtual memory by sensitivity levels, and then sanitize the pages of data in order of sensitivity level. That is, assume that a first page of data (i.e., a first predefined block of data from virtual memory) has a first sensitivity level (e.g., is data that is highly sensitive, such as social security numbers for persons). Assume now that a second page of data (from the virtual memory) has a second sensitivity level (e.g., is data that is not as sensitive, such as zip codes for persons' addresses). Thus, the first sensitivity level indicates a greater level of sensitivity than the second sensitivity level. As such, the first page of memory is sanitized before the second page of memory is sanitized.

In an embodiment of the present invention, one or more processors determine that a cache block associated with the virtual memory contains sensitive data used by the application, and then sanitize the sensitive data used by the application that is in the cache block in the virtual memory. That is, assume that a system emulates both virtual memory (e.g., emulates system memory) as well as a cache block of cache memory, which is associated with the virtual memory. As such, the data in the emulated cache block will be sanitized as well as the emulated system memory.

In an embodiment of the present invention, assume that all of the virtual memory is allocated for use by the application. In this embodiment, one or more processors sanitize all of the virtual memory.

However, assume now that in another embodiment that only a portion of the virtual memory is allocated for use by the application. In this embodiment, one or more processors sanitize only the portion of the virtual memory that is allocated for use by the application.

In an embodiment of the present invention, assume that the virtual memory allocates and stores both sensitive data and non-sensitive data for use by the application. In this embodiment, one or more processors sanitize only the sensitive data in the virtual memory that is allocated for use by the application without sanitizing non-sensitive data that is allocated for use by the application. That is, since the non-sensitive data poses no security issues, then there is no need to sanitize it.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
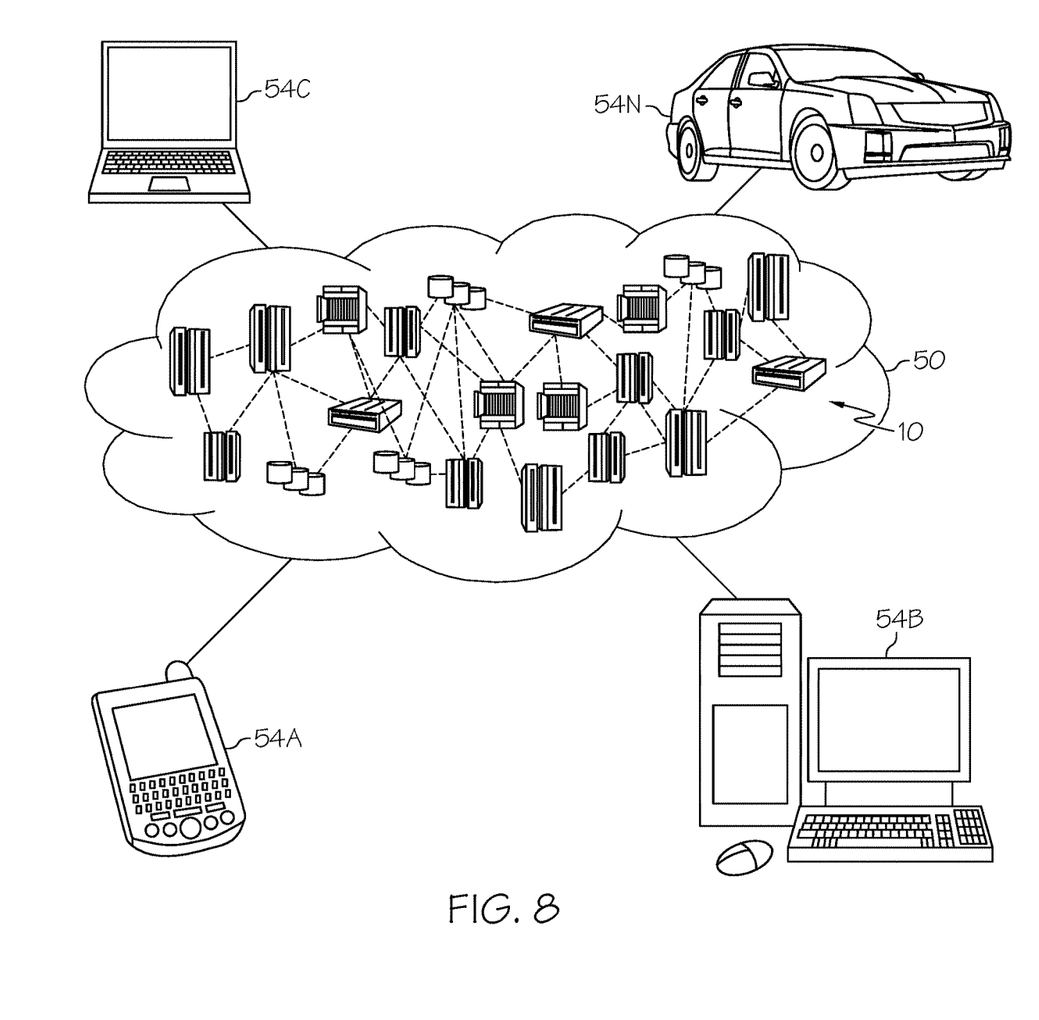
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
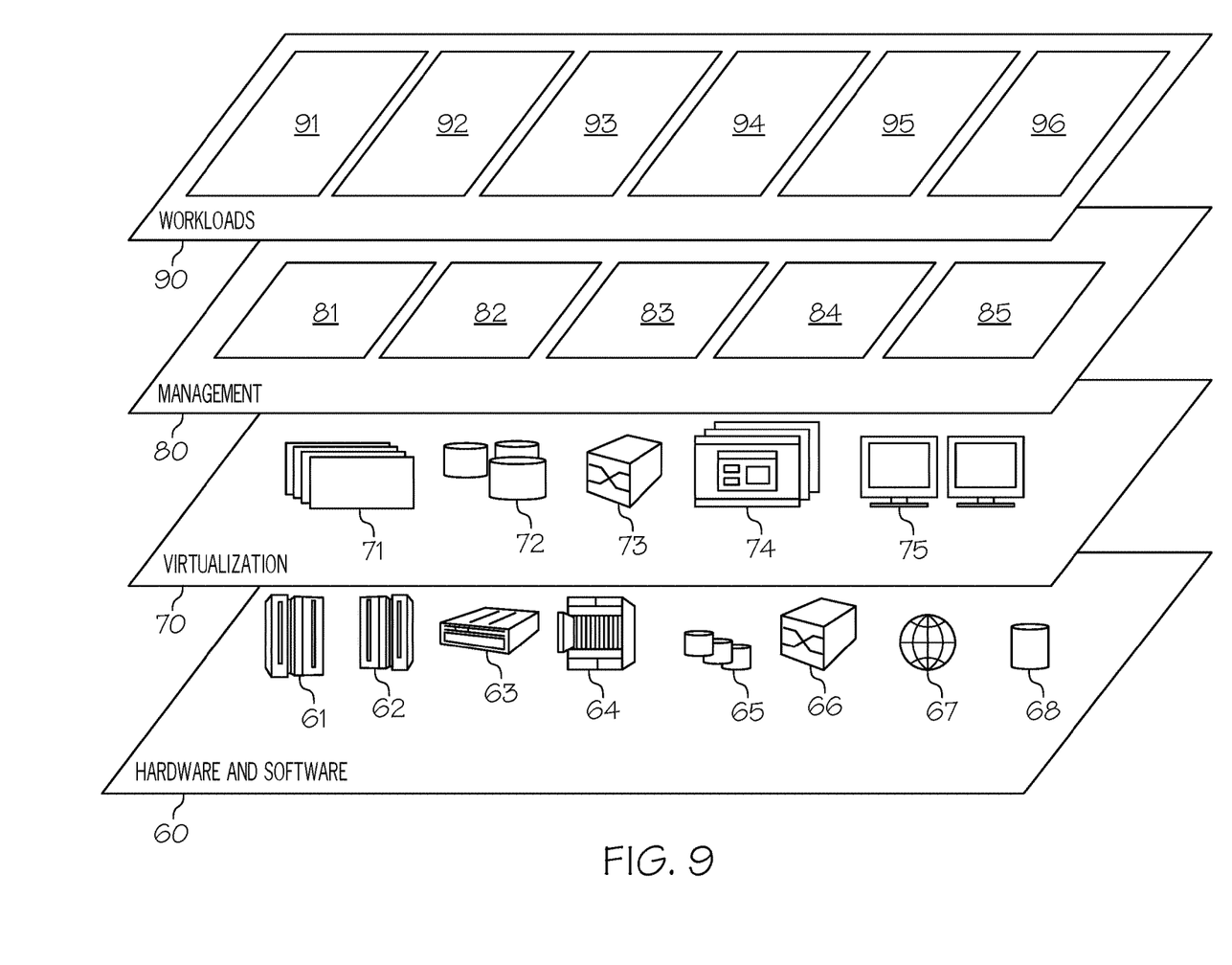
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual cloud-based memory sanitization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for sanitizing memory in a cloud environment, the computer-implemented method comprising:
    receiving, by a hypervisor, a hypercall from an application running in a computer, wherein the hypervisor manages a virtual memory in a cloud environment, wherein the hypercall directs the hypervisor to sanitize data in the virtual memory, wherein the data in the virtual memory is allocated for use by the application, and wherein the computer is a physical computer; and
    in response to receiving the hypercall, sanitizing, by the hypervisor, the data in the virtual memory that is allocated for use by the application, wherein sanitizing the data applies a data remanence policy that prevents remanence data in the virtual memory from being accessed by an unauthorized user.

2. The computer-implemented method of claim 1, further comprising:
    sanitizing, by a hardware sanitization module, a hardware memory that provides data to the virtual memory.

3. The computer-implemented method of claim 1, further comprising:
    ranking, by one or more processors, pages of data in the virtual memory by sensitivity levels; and
    sanitizing, by one or more processors, the pages of data in order of sensitivity level, wherein a first page of data has a first sensitivity level, wherein a second page of data has a second sensitivity level, wherein the first sensitivity level indicates a greater level of sensitivity than the second sensitivity level, and wherein the first page of data is sanitized before the second page of data is sanitized.

4. The computer-implemented method of claim 1, further comprising:
    determining, by one or more processors, that a cache block associated with the virtual memory contains sensitive data used by the application, wherein the cache block is stored in a physical cache; and
    sanitizing, by one or more processors, the sensitive data used by the application that is in the cache block that is associated with the virtual memory.

5. The computer-implemented method of claim 1, wherein all of the virtual memory is allocated for use by the application, and wherein the computer-implemented method further comprises:
    sanitizing, by one or more processors, all of the virtual memory.

6. The computer-implemented method of claim 1, wherein only a portion of the virtual memory is allocated for use by the application, and wherein the computer-implemented method further comprises:
    sanitizing, by one or more processors, only the portion of the virtual memory that is allocated for use by the application.

7. The computer-implemented method of claim 1, wherein the virtual memory allocates and stores both sensitive data and non-sensitive data for use by the application, and wherein the computer-implemented method further comprises:
    sanitizing, by one or more processors, only the sensitive data in the virtual memory that is allocated for use by the application without sanitizing non-sensitive data that is allocated for use by the application.

8. A computer program product for sanitizing memory in a cloud environment, the computer program product comprising a computer readable storage device having program instructions embodied therewith, the program instructions readable and executable by a computer to perform a method comprising:

receiving a hypercall resulting from a call from an application running in a computer, wherein the hypercall is to a hypervisor that manages a virtual memory in a cloud environment, wherein the hypercall directs the hypervisor to sanitize data in the virtual memory, wherein the data in the virtual memory is allocated for use by the application, and wherein the computer is a physical computer that communicates with the cloud environment via a network; and in response to receiving the hypercall, sanitizing the data in the virtual memory that is allocated for use by the application, wherein sanitizing the data applies a data remanence policy that prevents remanence data in the virtual memory from being accessed by an unauthorized user.

9. The computer program product of claim 8, wherein the method further comprises:

sanitizing a hardware memory that provides data to the virtual memory.

10. The computer program product of claim 8, wherein the method further comprises:

ranking pages of data in the virtual memory by sensitivity levels; and sanitizing the pages of data in order of sensitivity level, wherein a first page of data has a first sensitivity level, wherein a second page of data has a second sensitivity level, wherein the first sensitivity level indicates a greater level of sensitivity than the second sensitivity level, and wherein the first page of data is sanitized before the second page of data is sanitized.

11. The computer program product of claim 8, wherein the method further comprises:

determining that a cache block associated with the virtual memory contains sensitive data used by the application; and sanitizing the sensitive data used by the application that is in the cache block that is associated with the virtual memory.

12. The computer program product of claim 8, wherein all of the virtual memory is allocated for use by the application, and wherein the method further comprises:

sanitizing all of the virtual memory.

13. The computer program product of claim 8, wherein only a portion of the virtual memory is allocated for use by the application, and wherein the method further comprises:

sanitizing only the portion of the virtual memory that is allocated for use by the application.

14. The computer program product of claim 8, wherein the virtual memory allocates and stores both sensitive data and non-sensitive data for use by the application, and wherein the method further comprises:

sanitizing only the sensitive data in the virtual memory that is allocated for use by the application without sanitizing non-sensitive data that is allocated for use by the application.

15. The computer program product of claim 8, wherein the program instructions are provided as a service in the cloud environment.

16. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to receive a hypercall from an application running in a computer, wherein the hypervisor that manages a virtual memory in a cloud environment, wherein the hypercall directs the hypervisor to sanitize data in the virtual memory, wherein the data in the virtual memory is allocated for use by the application, and wherein the computer is a physical computer that communicates with the cloud environment via a network; and program instructions to, in response to receiving the hypercall, sanitize the data in the virtual memory that is allocated for use by the application, wherein sanitizing the data applies a data remanence policy that prevents remanence data in the virtual memory from being accessed by an unauthorized user.

17. The computer system of claim 16, further comprising:
program instructions to sanitize a hardware memory that provides data to the virtual memory.

18. The computer system of claim 16, further comprising:
program instructions to rank pages of data in the virtual memory by sensitivity levels; and program instructions to sanitize the pages of data in order of sensitivity level, wherein a first page of data has a first sensitivity level, wherein a second page of data has a second sensitivity level, wherein the first sensitivity level indicates a greater level of sensitivity than the second sensitivity level, and wherein the first page of data is sanitized before the second page of data is sanitized.

19. The computer-implemented method of claim 1, wherein the physical computer communicates with the cloud environment via a network.

20. The computer-implemented method of claim 1, further comprising:

identifying, by one or more processors, a persistent memory in the physical computer that contains the remanence data found in the virtual memory;

sanitizing, by one or more processors, the persistent memory in order to remove the remanence data from the persistent memory; and subsequent to sanitizing the persistent memory in order to remove the remanence data from the persistent memory, booting up, by one or more processors, the physical computer using the persistent memory that has had the remanence data removed, wherein booting up the physical computer using the persistent memory that has had the remanence data removed prevents the remanence data from being exposed during a cold-boot attack on the physical computer.

\* \* \* \* \*